US012676542B2

(12) United States Patent
Kim et al.

(10) Patent No.: US 12,676,542 B2
(45) Date of Patent: Jul. 7, 2026

(54) CIRCUIT FOR GENERATING AUXILIARY POWER

(71) Applicant: LG INNOTEK CO., LTD., Seoul (KR)

(72) Inventors: Soo San Kim, Seoul (KR); Dong Keun Yoon, Seoul (KR); Jae Yeop Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 217 days.

(21) Appl. No.: 18/575,687

(22) PCT Filed: Jul. 14, 2022

(86) PCT No.: PCT/KR2022/010303
§ 371 (c)(1),
(2) Date: Dec. 29, 2023

(87) PCT Pub. No.: WO2023/287229
PCT Pub. Date: Jan. 19, 2023

(65) Prior Publication Data
US 2024/0322666 A1    Sep. 26, 2024

(30) Foreign Application Priority Data
Jul. 14, 2021    (KR) ........................ 10-2021-0092374

(51) Int. Cl.
*H02M 1/00* (2006.01)
*H02M 3/335* (2006.01)

(52) U.S. Cl.
CPC ....... *H02M 1/0058* (2021.05); *H02M 1/0064* (2021.05); *H02M 3/33523* (2013.01); *H02M 3/33571* (2021.05)

(58) Field of Classification Search
CPC ............. H02M 1/0058; H02M 1/0064; H02M 3/33523; H02M 3/33571; H02M 1/08;
(Continued)

(56) References Cited

U.S. PATENT DOCUMENTS 5,737,203 A    4/1998 Barrett
10,177,669 B1 * 1/2019 Chiu ................. H02M 3/33571
(Continued)

FOREIGN PATENT DOCUMENTS

JP    2003-189622    7/2003
JP    2005-168094    6/2005
(Continued)

OTHER PUBLICATIONS

International Search Report dated Oct. 28, 2022 issued in Application No. PCT/KR2022/010303.

*Primary Examiner* — Kyle J Moody
(74) *Attorney, Agent, or Firm* — KED & ASSOCIATES, LLP

(57) ABSTRACT

A circuit for generating auxiliary power according to an embodiment of the present invention comprises: a switching unit including at least one upper switch and at least one lower switch which are rendered conductive in a complementary manner; a resonant converter which converts power input from the switching unit and outputs the converted power; and a rectifier which rectifies an output of the resonant converter to output auxiliary power.

16 Claims, 9 Drawing Sheets

(58) Field of Classification Search
  CPC .. H02M 1/0006; H02M 3/01; H02M 3/33573;
                                      H02M 7/487
  See application file for complete search history.

(56)                    References Cited

U.S. PATENT DOCUMENTS

| | | | |
|---|---|---|---|
| 2002/0075698 A1* | 6/2002 | Kuranuki | H02M 1/34 |
| | | | 363/17 |
| 2009/0059622 A1* | 3/2009 | Shimada | H02M 1/32 |
| | | | 363/17 |
| 2010/0232180 A1* | 9/2010 | Sase | H02M 3/33576 |
| | | | 363/17 |
| 2014/0334191 A1* | 11/2014 | Gekinozu | H02M 3/01 |
| | | | 363/17 |
| 2016/0322968 A1* | 11/2016 | Mao | H03F 1/0222 |
| 2017/0025963 A1* | 1/2017 | Otake | H02M 3/33571 |
| 2017/0317601 A1* | 11/2017 | Jin | H02M 3/33584 |
| 2023/0421070 A1* | 12/2023 | Kim | H02M 3/33573 |

FOREIGN PATENT DOCUMENTS

| | | |
|---|---|---|
| JP | 2007-259614 | 10/2007 |
| JP | 2008-219978 | 9/2008 |

* cited by examiner

100

150      110      120      130      140

Input unit → Switching unit → Resonant converter → Rectifier → Output unit

CIRCUIT FOR GENERATING AUXILIARY POWER

CROSS-REFERENCE TO RELATED PATENT APPLICATIONS

This application is a U.S. National Stage Application under 35 U.S.C. § 371 of PCT Application No. PCT/KR2022/010303, filed Jul. 14, 2022, which claims priority to Korean Patent Application No. 10-2021-0092374, filed Jul. 14, 2021, whose entire disclosures are hereby incorporated by reference.

TECHNICAL FIELD

The present invention relates to a circuit for generating an auxiliary power, and more specifically, relates to a circuit for generating an auxiliary power that individually supplies a plurality of floating power sources, an auxiliary power generation device, and a power conversion device.

BACKGROUND ART

Photovoltaic power generation is an eco-friendly energy generation method that is widely used as a replacement for existing chemical or nuclear power generation. Photovoltaic power generation is divided into an independent type where a battery is connected to a converter and a linked type where a battery is connected to the power system. In general, stand-alone power generation is configured with solar cells, storage batteries, power conversion devices, and the like, and a power grid-connected system is configured to be connected to a commercial power source to exchange power with the load grid line.

The power generated by photovoltaic power generation (PV) is transmitted to the grid, which is a power system, through an inverter. At this time, depending on the power type of the grid, the inverter converts the power to match the voltage of the power being outputted from the photovoltaic power generation panel with the voltage of the grid.

Inverters are constructed in various forms using switching elements. When the grid is in the form of three-phase power, the inverter can be implemented as a three-phase inverter, as shown in FIG. 1. The inverter can comprise T-type and may comprise 12 switching elements: Q1A, Q1B, Q2A, Q2B, Q3A, Q3B, Q4A, Q4B, Q5A, Q5B, Q6A, and Q6B. At this time, four switching elements per phase are applied. It can be converted into three phases by forming one phase with Q1A, Q1B, Q4A, and Q4B, one phase with Q2A, Q2B, QA5, and Q5, and the remaining phase with Q3A, Q3B, Q6A, and Q6B, respectively, as T-type.

In order to supply auxiliary power to drive each switching element, when a module with a split output structure is used for the leg of each switching element, since all switching elements except Q1B, Q2B, and Q3B being connected to the ground, the positions of the reference potential emitters are all different, and therefore a gate driver power supply with 10 different reference potentials must be created, thereby requiring an isolated converter to generate multiple auxiliary powers. At this time, as shown in FIG. 2, a flyback converter can be used. Multiple auxiliary powers 11 and 12 can be generated using a flyback converter, but when controlling the output voltage of the master auxiliary power 11 among the auxiliary powers, it is difficult to control the output voltage of the slave auxiliary power 12. When the amount and characteristics of the load applied to the output voltage of the master auxiliary power 11 and the slave auxiliary power 12 are different, changes in the output voltage of the slave auxiliary power 12 occurs. For example, when the load on the master auxiliary power 11 is large and the load on the slave auxiliary power 12 is small, the output voltage of the slave auxiliary power 12 increases. As the load increases and the current flowing on the output side increases, the voltage drops causing a problem in which it is difficult to supply an auxiliary power suitable for the load because individual control is difficult.

DETAILED DESCRIPTION OF THE INVENTION

Technical Subject

The technical problem to be solved by the present invention is to provide a circuit for generating an auxiliary power, an auxiliary power generation device, and a power conversion device that individually supply a plurality of floating power sources.

Technical Solution

In order to solve the above technical problem, a circuit for generating auxiliary power according to an embodiment of the present invention comprises: a switching unit including at least one upper switch and at least one lower switch which are conducting complementarily to each other; a resonant converter which converts power being inputted from the switching unit and outputs the converted power; and a rectifier which rectifies an output of the resonant converter to output auxiliary power.

In addition, the switching unit may be formed as a half-bridge circuit including one upper switch and one lower switch, or may be formed as a full-bridge circuit including a plurality of upper switches and a plurality of lower switches.

In addition, the resonant converter may include: a primary circuit comprising a resonant circuit; and a secondary circuit including a first coil and a second coil being connected in parallel.

In addition, the primary circuit comprises: a first capacitor and a second capacitor being connected in series with each other; a first inductor being connected to a node between the first capacitor and the second capacitor; and a third coil being connected in series with the first inductor, wherein the upper switch and the lower switch are connected in series, wherein one end of the third coil is connected to the first inductor and the other end is connected to a node between the upper switch and the lower switch, and wherein the first coil, the second coil, and the third coil may form a transformer.

In addition, the primary circuit may comprise an LLC resonant converter, an LCC resonant converter, or a CLC resonant converter.

In addition, the rectifier may include a first diode being connected in series with the first coil and a second diode being connected in series with the second coil.

In addition, it includes an output unit that provides power being outputted from the rectifier as an auxiliary power, wherein one end of the output unit is connected to a node between the first diode and the second diode, and the other end may be connected to a node between the first coil and the second coil.

In addition, the resonant converter includes: a plurality of primary circuits being connected in parallel; and a plurality of secondary circuits corresponding to the plurality of primary circuits, wherein the rectifier includes a plurality of rectifiers corresponding to the plurality of secondary circuits, wherein the plurality of primary circuits may output a plurality of individual auxiliary powers through one secondary circuit among the plurality of secondary circuits and one rectifier among the plurality of rectifiers.

In addition, the auxiliary power may be a power of gate driver of a switching element having a reference potential different from the ground.

In addition, the resonant converter can operate at a resonant frequency.

In order to solve the above technical problem, the auxiliary power generation device according to an embodiment of the present invention comprises: a switching unit including at least one upper switch and at least one lower switch which are conducting complementarily to each other; a resonant converter that converts the voltage being inputted from the switching unit and outputs it; a rectifier that rectifies the output of the resonant converter and outputs an auxiliary power; and a control unit that controls the switching frequency of the switching unit so that the resonant converter operates at a resonant frequency.

In order to solve the above technical problem, a power conversion device according to an embodiment of the present invention includes: a plurality of switching elements; and an auxiliary power generation circuit according to an embodiment of the present invention, wherein the auxiliary power generation circuit supplies individual auxiliary power to each of the plurality of switching elements.

Advantageous Effects

According to embodiments of the present invention, since it operates at a resonance point, the gain is the same regardless of the load, so it is possible to improve the disadvantages that appear depending on the characteristics of the load in flyback. In addition, it is easy to scale up depending on the number of power supplies required, and the switching frequency can be changed through the MCU according to scaling up, making it easy to implement. In addition, it is possible to use an inexpensive gate driver rather than a converter-specific IC, and since no peripheral elements for control are required, an inexpensive circuit can be realized. In other words, it is easy to apply to applications that use MCU. Furthermore, when operating at the resonance point, current flows in the form of a trigonometric function such as a sine wave, and the current always flows continuously, so electromagnetic interference (EMI) characteristics are excellent.

4

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention. In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under)", the meaning of not only an upward direction but also a downward direction based on one component may be included.

Figure 3:
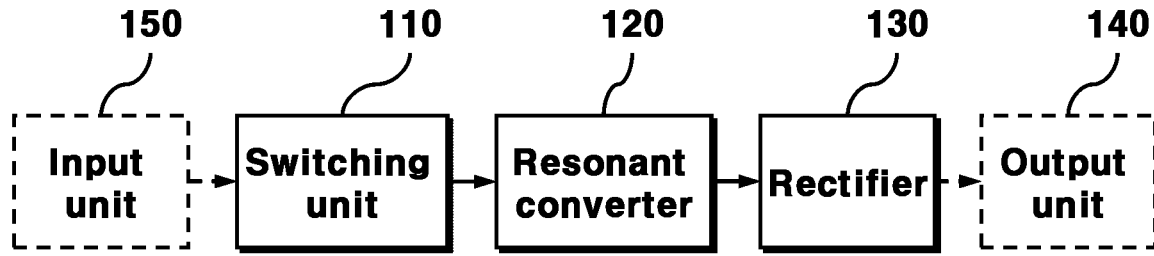
FIG. 3 is a block diagram of an auxiliary power generation circuit according to an embodiment of the present invention.

FIG. 3 is a block diagram of an auxiliary power generation circuit according to an embodiment of the present invention.

The auxiliary power generation circuit 100 according to an embodiment of the present invention comprises a switching unit 110, a resonant converter unit 120, and a rectifier unit 130, and may include an output unit 140, an input unit 150, or a control unit.

The switching unit 110 includes at least one upper switch and at least one lower switch conducting complementarily to each other. The switching unit 110 may be formed as a half-bridge circuit including one upper switch and one lower switch, or may be formed as a full-bridge circuit including a plurality of upper switches and a plurality of lower switches. Each switch may be a semiconductor switching device such as an IGBT or FET, or may be a variety of other switching devices. Each switch can operate on or off with a duty. Here, duty is the turn-on ratio per cycle, also called on-off ratio. The switching unit 110 may be turned on or off by a gate driver that supplies driving power to the gate power. At this time, the duty of the switching unit 110 is fixed, but its operation may be controlled according to the switching frequency. At this time, the switching frequency or duty can be controlled by a control unit such as an MCU.

The resonant converter 120 converts the power being inputted from the switching unit 110 and outputs it. The resonant converter 120 converts the power being inputted from the switching unit 110 according to the switching operation of the switching unit 110. The resonant converter 120 may include a resonance circuit and operate at the resonance point of the resonance circuit to convert power being inputted from the switching unit 110.

The resonant converter 120 may include a primary circuit comprising a resonance circuit and a secondary circuit including a first coil and a second coil being connected in parallel. The primary circuit forms a resonance circuit and can operate at a resonance frequency, and the secondary circuit can receive power from the primary circuit according to the operation of the primary circuit.

At this time, the primary circuit may include: a first capacitor and a second capacitor being connected in series with each other; a first inductor being connected to a node between the first capacitor and the second capacitor; and a third coil being connected in series with the first inductor. Here, the third coil corresponds to an inductor, and a first inductor, a third coil (inductor), a first capacitor, and a second capacitor can form an LLC resonance circuit. In this way, the primary circuit can configure an LLC resonant converter. In addition, an LCC resonant converter or a CLC resonant converter can be configured. To configure the LCC and CLC, a capacitor other than the first inductor may be further included, and various resonance circuits may be configured depending on the configuration of the inductor and capacitor. In addition, it is natural that a resonant converter can be constructed by configuring various resonant circuit types and using various elements accordingly.

In the switching unit 110, the upper switch and the lower switch are connected in series, one end of the third coil is connected to the first inductor, and the other end may be connected to a node between the upper switch and the lower switch. The third coil is connected in series with the first inductor, one end is connected between the first capacitor and the second capacitor through the first inductor, and the other end is connected between the upper switch and the lower switch. When the upper switch is turned on and the lower switch is turned off according to the operation of the switching unit 110, the path through which the current flows in the primary circuit is formed by the upper switch—the third coil—the first inductor—the second capacitor. At this time, an LLC resonance circuit is formed in the order of the third coil—the first inductor—the second capacitor, and thus can resonate at the resonance frequency. When the upper switch is off and the lower switch is on, the path through which the current flows in the primary circuit is formed by the first capacitor—the first inductor—the third coil—the lower switch. At this time, a CLL resonance circuit is formed in the order of the first capacitor—the first inductor—the third coil, and thus can resonate at the resonance frequency.

The resonant converter 120 can operate at a resonant frequency. In order to operate the resonant converter 120 at the resonant frequency, the switching operation of the switching unit 110 can be controlled. At this time, a control unit such as an MCU can control the gate drivers of the upper switching and lower switching units of the switching unit 110 so that the resonant converter 120 operates at the resonant frequency. At this time, the resonant converter 120 can be operated at the resonance frequency through frequency modulation rather than pulse width modulation (PWM). That is, the duty of the switching unit 110 can be fixed and the frequency can be changed. By controlling the switching frequency of the switching unit 110, the resonant converter 120 can be operated at the resonance frequency. At this time, the frequency of the control signal can be controlled. The frequency of the control signal can be calculated using the resonance frequency and switching frequency, and the control signal can be outputted accordingly. At this time, the relationship between the resonant frequency FR and the switching frequency FS of the frequency F of the control signal may be F=FR/FS.

The first coil, the second coil, and the third coil may form a transformer. The third coil of the primary circuit and the first and second coils of the secondary circuit form a transformer, so that power can be transferred from the third coil to the first and second coils through electromagnetic induction. When a current flows in the third coil, the current flows in the first coil and the second coil according to electromagnetic induction, and through this, the power from the primary side is transferred to the secondary side. The third coil, the first coil, and the second coil are in a state of being wound around one another, and the first coil and the second coil may be configured to be parallel. At this time, the first coil and the second coil may be formed in the same direction as the third coil. The first coil and the second coil may be secondary coils divided by a center tap method, and the turn ratio between the third coil and the first and second coils may be 1:0.5, respectively.

The first coil and the second coil may be formed in opposite directions from the third coil, or the first coil and the second coil may be formed in different directions. The secondary side circuit may include three or more coils in addition to the first coil and the second coil, and the third coil on the primary side may also include a plurality of coils. It is natural that a transformer can be configured with various types of coils.

The rectifier 130 rectifies the output of the resonant converter 120 and outputs auxiliary power. The rectifier 130 rectifies the output of the resonant converter 120 in order to output the power being outputted from the resonant converter 120 as auxiliary power. The rectifier 130 can rectify the output of the resonant converter 120 using half-wave rectification, full-wave rectification, and center tap methods. Here, half-wave rectification is a rectification method that passes only half of the sine wave and blocks the other half, so the current flows in only one direction. Full-wave rectification is a rectification method that allows the entire sinusoidal wave to pass but ensures that the current flows only in the same direction, and the current also flows in only one direction. The center tap method is a method of rectifying by connecting a line to the center tap, which is the center of the secondary coil, in which each secondary coil divided by the primary coil and center tap has a turn ratio of 1:0.5 or 1:0.5 instead of 1:1.

The rectifier 130 may include a first diode and a second diode. The first diode may be connected in series with the first coil, and the second diode may be connected in series with the second coil. The first coil and the second coil of the secondary circuit may be implemented in a center tap method, at this time, the first diode rectifies the current being induced from the primary circuit to the first coil to flow in only one direction, and the second diode can rectify the current being induced from the primary circuit to the second coil so that it flows in only one direction. Since the current flowing in the third coil of the primary circuit flows in both directions, the first coil and the second coil also flow in both directions, and the current being outputted from the first coil and the second coil can be rectified so that it flows in only one direction by the first diode and the second diode.

The output unit 140 can provide power being outputted from the rectifier 130 as an auxiliary power. The output unit 140 can provide the power being outputted from the rectifier unit 130 as an auxiliary power to a device that uses the power as a driving power. A device that uses auxiliary power as a driving power may be a switching element of an inverter. In addition, it is natural that auxiliary power can be supplied to various devices.

One end of the output unit 140 is connected to a node between the first diode and the second diode, and the other end may be connected to a node between the first coil and the second coil. The output unit 140 is connected to a node between the first diode and the second diode, so that the output being rectified by the first and second diodes of the rectifier 130 can be inputted. The other end may be connected to a node between the first coil and the second coil, that is, a center tab. One end of the output unit 140 may be a (+) terminal and the other end may be a (−) terminal. The output unit 140 may include a capacitor. The voltage being outputted to the rectifier 130 is charged in the capacitor, and the voltage charged in the capacitor can be supplied as an auxiliary power.

Figure 1:
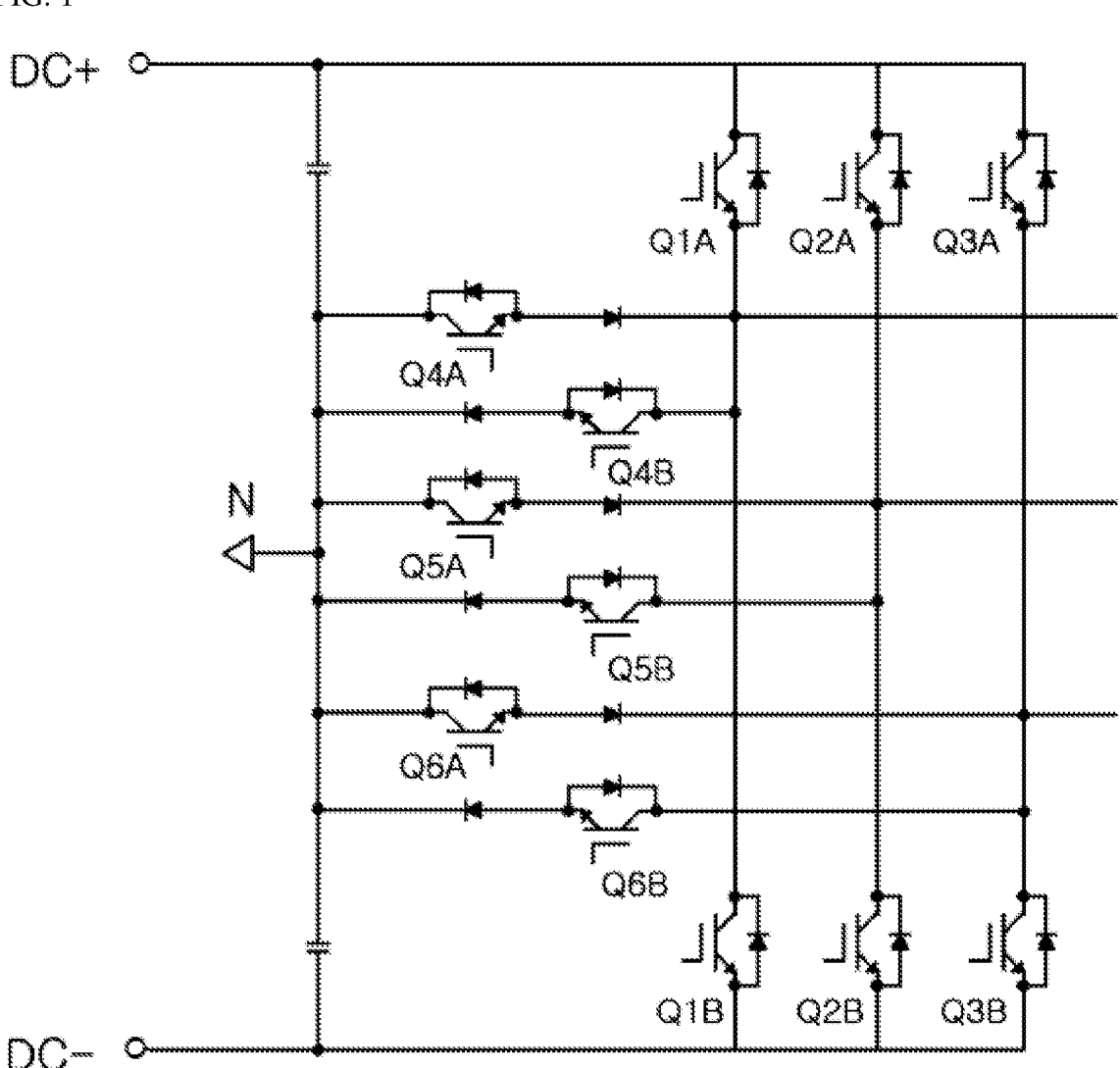
FIGS. 1 and 2 are diagrams for explaining a comparative embodiment of the present invention.

The auxiliary power may have a reference potential different from the ground, and may be provided as a gate driver power of the switching element of the power conversion device. Since the reference potential of the auxiliary power being outputted to the output unit 140 is the (−) terminal of the output unit 140, the output unit 140 can supply auxiliary power with the (−) terminal, not the ground, as the reference potential. At this time, as shown in FIG. 1, auxiliary power having individual reference potentials can be supplied to a plurality of floating switching elements.

The input unit 150 can receive power used to generate an auxiliary power. The input unit 150 can receive power from a device intended to supply an auxiliary power. For example, when an auxiliary power is supplied to an inverter, the input unit 150 can receive power being inputted to the inverter or power being converted by the inverter. In addition, like the grid, various power sources can be inputted depending on the location where the auxiliary power generation circuit, such as an external power, is applied.

Figure 4:
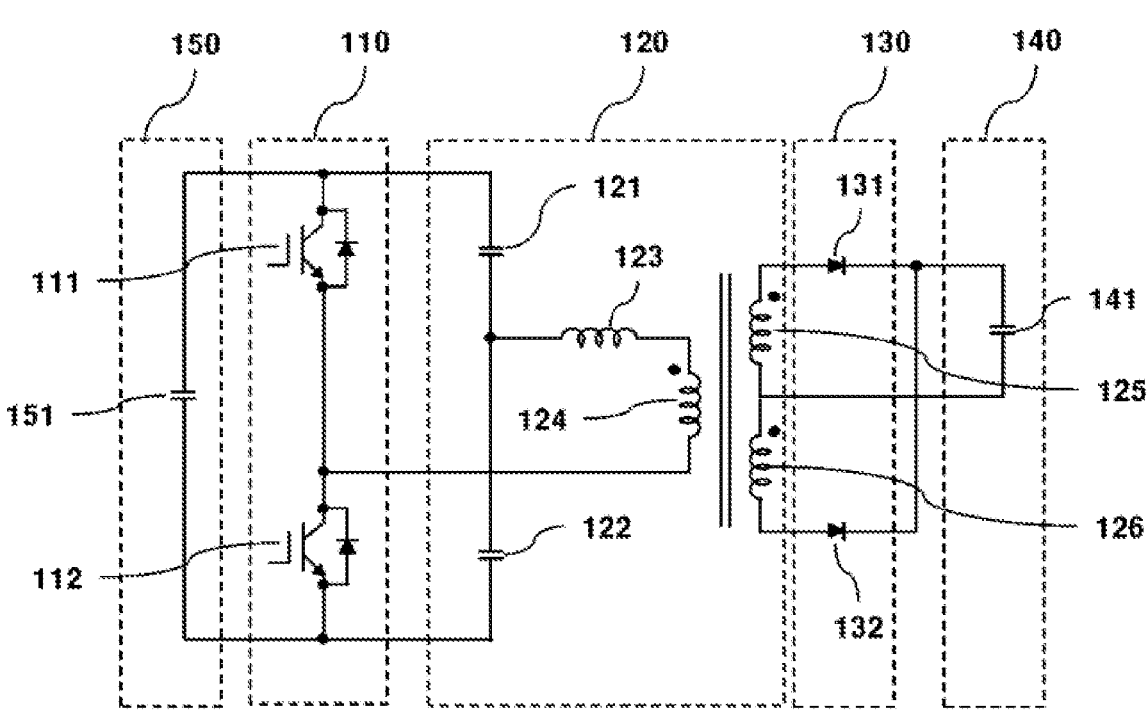
FIGS. 4 to 7 are diagrams for explaining an auxiliary power generation circuit according to an embodiment of the present invention.

The auxiliary power generation circuit according to an embodiment of the present invention may be implemented as shown in FIG. 4. The input unit 150 can receive power to generate an auxiliary power. The input unit 150 includes a capacitor 151 and can stably receive power input. The switching unit 110 may include an upper switch 111 and a lower switch 112. The upper switch 111 and the lower switch 112 are conducting complementarily to each other and can operate as a half bridge. The resonant converter 120 may comprise a resonance circuit and a transformer. The primary circuit of the resonant converter 120 may be configured as an LLC resonance converter, as shown in FIG. 3. It includes a first capacitor 121 and a second capacitor 122 being connected in parallel with the upper switch 111 and the lower switch 112; it includes a first inductor 123 being connected between the first capacitor 121 and the second capacitor 122, and a third coil 124 being connected between the upper switch 111 and the lower switch 112; and the first inductor 123 and the third coil 124 may be connected in series. The secondary circuit uses a center tap method, and the first coil 125 and the second coil 126 may be connected in parallel through the center tap. The rectifier 130 includes a first diode 131 being connected to the first coil 125 and a second diode 132 being connected to the second coil 126 so as to rectify the outputs of the first coil 125 and the second coil 126. The output unit 140 can supply the output of the rectifier 130 as an auxiliary power to devices that require driving power. The output unit 140 includes a capacitor 141, thereby stably supplying auxiliary power.

Figure 5:
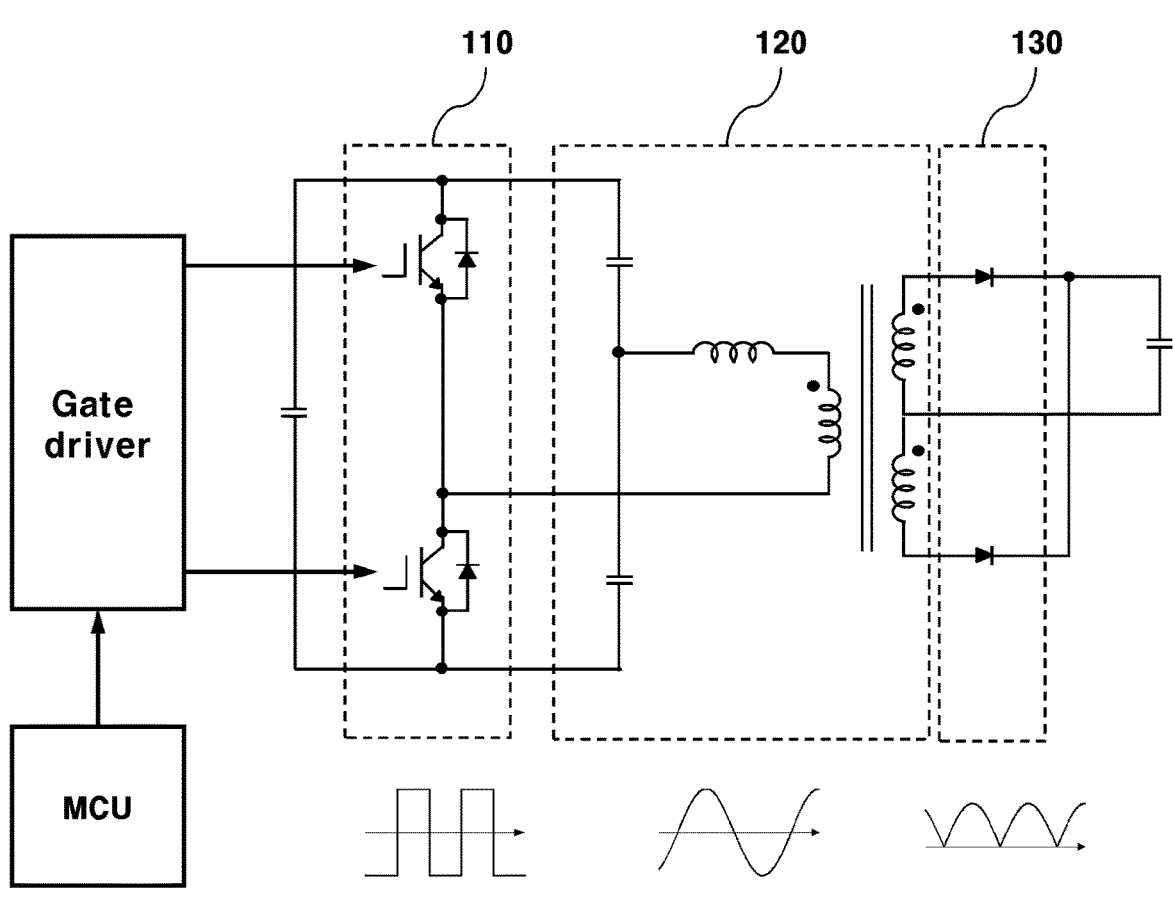

The switching unit 110 may be turned on and off by a gate driver, as shown in FIG. 5. The switching unit 110 may operate with a predetermined duty by a gate driver controlled by the MCU. The power being inputted to the input unit by the on-off operation of the switching unit 110 is inputted to the resonant converter 120 as a pulse signal. The resonant converter 120 operates at a resonant frequency, and at this time, the power of the pulse signal is converted into a sine wave of a trigonometric function. The sinusoidal power being transmitted to the secondary side through the transformer is converted from a negative sinusoidal wave into a positive sinusoidal wave through the rectifier 130, thereby generating an auxiliary power in the form shown in FIG. 5. At this time, the reference potential of the auxiliary power being generated becomes the (−) terminal of the output capacitor. Through this, it is possible to generate auxiliary power that uses the (−) terminal of the output capacitor, rather than the ground, as the reference potential.

The resonant converter 120 includes a plurality of primary circuits connected in parallel and a plurality of secondary circuits corresponding to the plurality of primary circuits; the rectifier includes a plurality of rectifiers corresponding to the plurality of secondary circuits; and the plurality of primary circuits can output multiple individual auxiliary powers through one secondary circuit among the plurality of secondary circuits and one rectifier among the plurality of rectifiers.

Multiple auxiliary powers can be generated by forming a plurality of resonant converters 120 and a rectifier 130 and connecting them in parallel. As shown in FIG. 1, when generating a plurality of auxiliary powers with different reference potentials, the number of resonant converters 120 and rectifiers 130 being connected in parallel can be increased depending on the number of required auxiliary powers.

At this time, the plurality of primary circuits of the resonant converter 120 is connected in parallel; a plurality of primary circuits, a plurality of secondary circuits corresponding to the plurality of primary circuits, and a plurality of rectifiers corresponding to the plurality of secondary circuits are included; one primary circuit, one secondary circuit, and one rectifier 130 are configured as one set; and each set can be connected in parallel. For each set, an individual auxiliary power can be generated where one end of the rectifier 130, that is, the (−) terminal of the output unit 140 being connected to the rectifier 130, becomes the reference potential.

When connecting the resonant converter 120 in parallel, the first inductor and third coil being connected in series in the primary circuit can be configured in a plurality of sets and connected in parallel. A plurality of auxiliary powers can be generated by scaling up only the second inductor and the third coil in parallel without adding the first and second capacitors. One auxiliary power can be generated by forming a set of a first coil, a second coil, a first diode, and a second diode corresponding to the second inductor and the third coil. By connecting each set in parallel, the scalability of auxiliary power generation can be increased.

Figure 6:
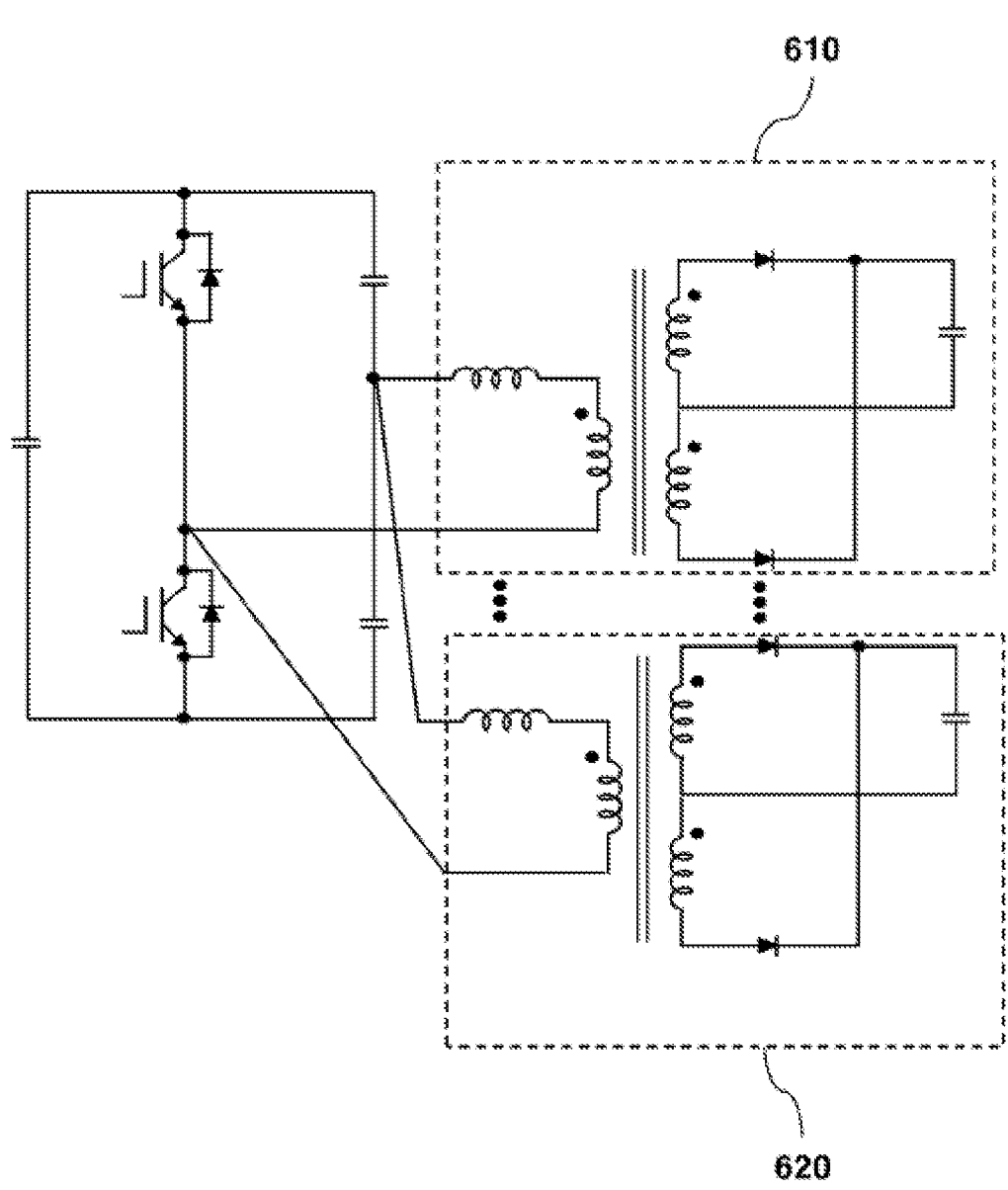

In order to generate a plurality of auxiliary powers, when a plurality of resonant converters 120 and rectifiers 130 are formed, it can be implemented as shown in FIG. 6. Auxiliary power generation can be scaled up by connecting one or more sets 620 in parallel to the set 610 comprising the first inductor, the third coil, the first coil, the second coil, the first diode, the second diode, and the capacitor.

Figure 7:
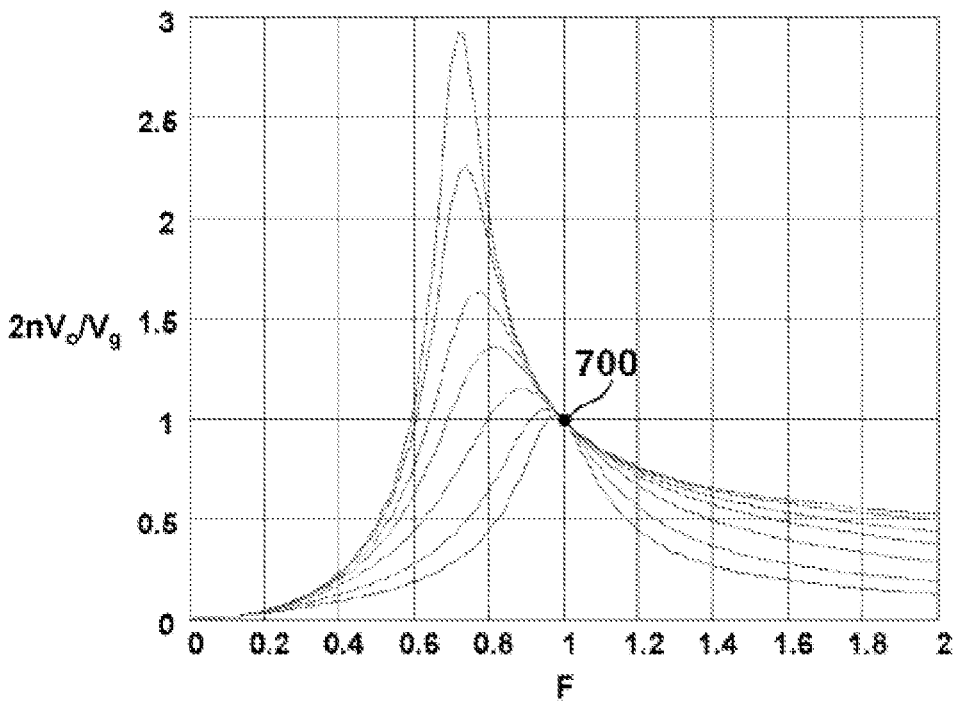

When the resonant converter 120 is implemented as an LLC resonant converter, the ratio of gain according to frequency is as shown in FIG. 7. Depending on the size of the load being connected to the output terminal, the relationship between frequency and gain varies as shown in FIG. 7. The maximum gain value becomes larger as the load becomes smaller, and the maximum gain value becomes smaller as the load becomes larger. In other words, the smaller the load, the upper graph is displayed, and the larger the load, the lower graph is displayed. As shown in FIG. 7, when operating at the point where F=1, it can be seen that the gain is always 1 even if the load changes. Here, F=FR (resonant frequency)/FS (switching frequency).

By controlling the switching frequency of the switching unit 110, the resonant converter 120 can be operated at the resonance point (F=1). When operating at the resonance point, the gain of each resonant converter 120 is the same, and because of this, the gain is the same even if the load varies, thereby preventing the voltage of the auxiliary power supply from dropping individually.

Figure 2:
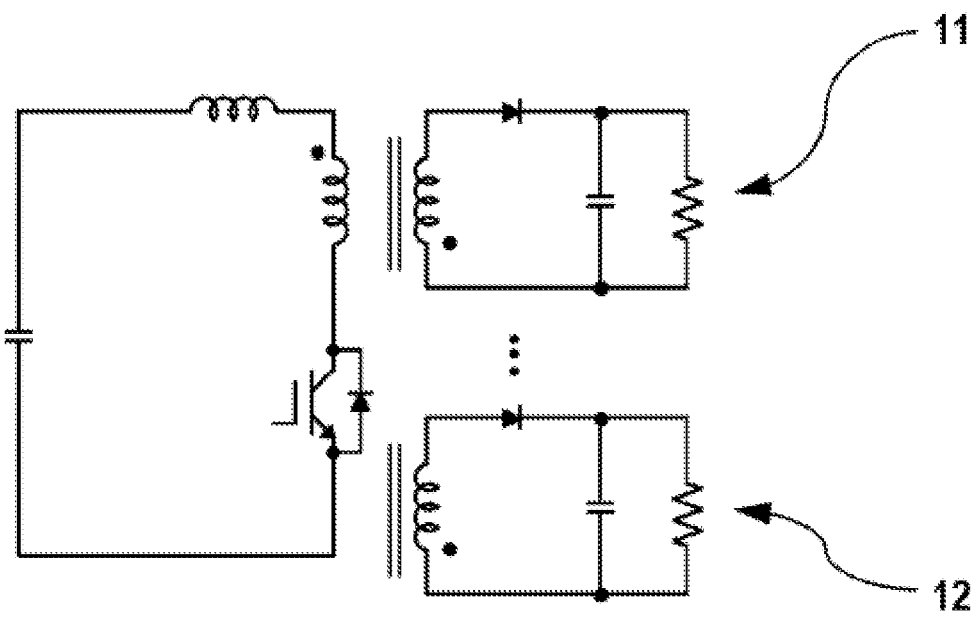

Since only the transformer being configured with the primary and secondary circuits, diodes forming the rectifier, and capacitors forming the output unit, are needed to be added depending on the number of required auxiliary powers, scalability can be increased. As shown in FIG. 2, when using a flyback, the configuration of the transformer must be redesigned every time the number of auxiliary powers changes, and there may be design limitations depending on the specifications of the transformer or application space.

In addition, it is easy to implement because the switching frequency change due to scaling up can be changed through the MCU, which is the control unit, and inexpensive circuit implementation becomes possible since an inexpensive gate driver rather than a converter-specific IC can be used, and peripheral elements for control are not included. It can be applied to devices or applications that use MCU without adding additional devices.

In addition, sinusoidal wave characteristics such as sine waves can be used, making it strong in electromagnetic interference (EMI) characteristics. As shown in FIG. 2, when a flyback is used, a current flows in the form of a triangular wave or pulse rather than a triangular function, and the current includes signals of various characteristics, which reduces electromagnetic wave shielding. However, when the auxiliary power generation circuit 100 according to an embodiment of the present invention operates at the resonance point, the electromagnetic wave shielding characteristics are stronger than other applications because the current flows as a sinusoidal wave, which is a sine wave, and the current always flows continuously.

Figure 8:
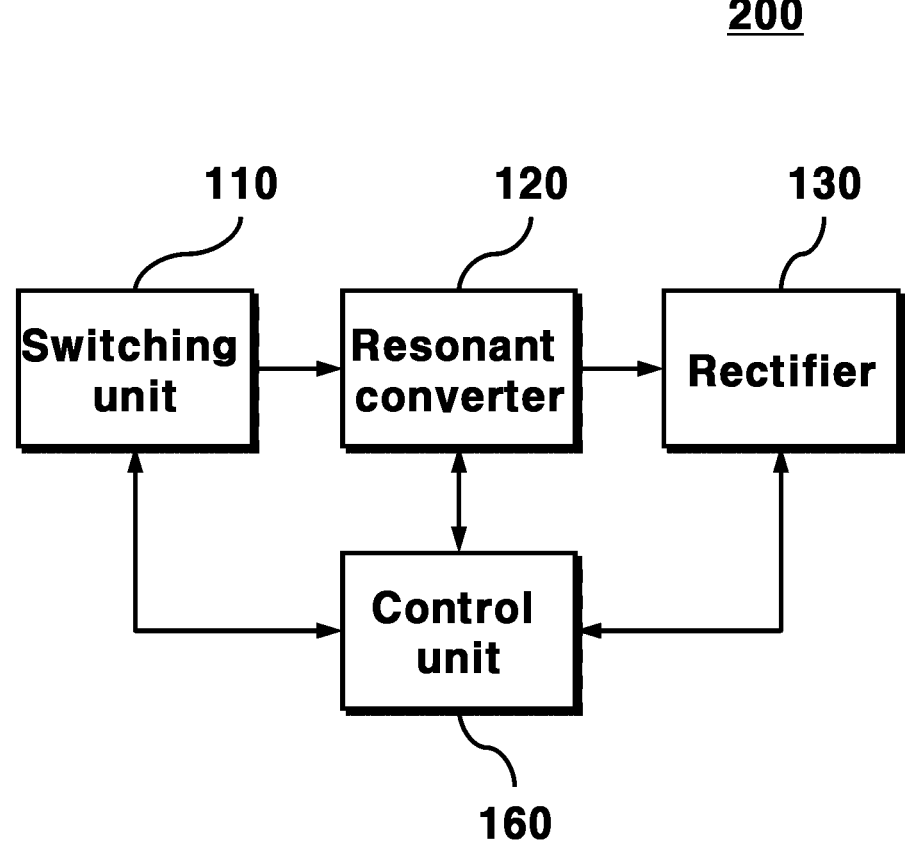
FIG. 8 is a block diagram of an auxiliary power generation device according to an embodiment of the present invention.

FIG. 8 is a block diagram of an auxiliary power generation device according to an embodiment of the present invention.

The auxiliary power generator 200 according to an embodiment of the present invention includes a switching unit 110, a resonant converter 120, a rectifier 130, and a control unit 160. The detailed description of each component in FIG. 8 corresponds to the detailed description of the auxiliary power generation circuit in FIGS. 3 to 7, and overlapping descriptions will be omitted hereinafter.

The switching unit 110 includes at least one upper switch and at least one lower switch being conducted complementarily to each other, wherein the resonant converter 120 converts the voltage being inputted from the switching unit 110 and outputs it, wherein the rectifier 130 rectifies the output of the resonant converter 120 and outputs auxiliary power, and wherein the control unit 160 controls the switching frequency of the switching unit 110 so that the resonant converter 120 operates at the resonant frequency.

The switching unit 110 may be formed as a half-bridge circuit including one upper switch and one lower switch, or may be formed as a full-bridge circuit including a plurality of upper switches and a plurality of lower switches.

The resonant converter 120 may include: a primary circuit configuring a resonant circuit; and a secondary circuit including a first coil and a second coil being connected in parallel, wherein the primary circuit includes: a first capacitor and a second capacitor being connected in series with each other; a first inductor being connected to a node between the first capacitor and the second capacitor; and a third coil being connected in series with the first inductor, wherein the upper switch and the lower switch are connected in series, wherein one end of the third coil is connected to the first inductor, and the other end is connected to a node between the upper switch and the lower switch, wherein the first coil, the second coil, and the third coil may form a transformer, and wherein the primary circuit may comprise an LLC resonant converter, an LCC resonant converter, or a CLC resonant converter.

The rectifier 130 may include a first diode being connected in series with the first coil and a second diode being connected in series with the second coil, and may include an output unit 140 that provides power being outputted from the rectifier as auxiliary power, wherein one end of the output unit 140 may be connected to a node between the first coil and the second coil, and the other end may be connected to a node between the first diode and the second diode.

The resonant converter 120 includes: a plurality of primary circuits being connected in parallel; and a plurality of secondary circuits corresponding to the plurality of primary circuits, wherein the rectifier includes a plurality of rectifiers corresponding to the plurality of secondary circuits, wherein the plurality of primary circuits may output multiple individual auxiliary power through one secondary circuit among the plurality of secondary circuits and one rectifier among the plurality of rectifiers, wherein the auxiliary power may be a gate driver power of a switching element having a reference potential different from the ground, and wherein the resonant converter can operate at a resonant frequency according to the control of the control unit 160.

Figure 9:
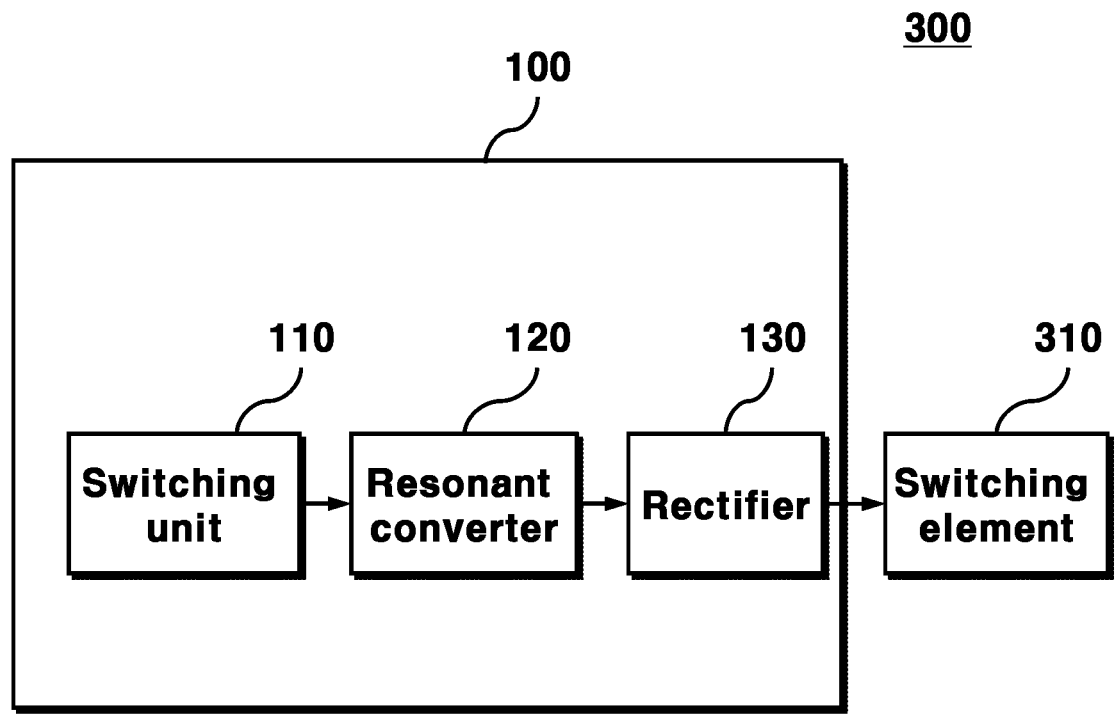
FIG. 9 is a block diagram of a power conversion device according to an embodiment of the present invention.

FIG. 9 is a block diagram of a power conversion device according to an embodiment of the present invention.

The power conversion device 300 according to an embodiment of the present invention comprises: a plurality of switching elements 310; and an auxiliary power generation circuit 100, wherein the auxiliary power generation circuit 100 includes a switching unit 110, a resonant converter 120, and a rectifier 130. The detailed description of each component in FIG. 9 corresponds to the detailed description of the auxiliary power generation circuit in FIGS. 3 to 7, and overlapping descriptions will be omitted hereinafter.

The power conversion device 300 according to an embodiment of the present invention comprises: a plurality of switching elements 310 for converting power; and an auxiliary power generation circuit 100 that supplies individual auxiliary power to each of the plurality of switching elements 320.

The power conversion device 300 may be a DC-DC converter or inverter for converting power. Here, an inverter is a device that converts DC power into AC power, and may also be referred to as a DC-AC converter. The power conversion device 300 may be a power conversion device being used in a solar power generation system. It may be an inverter that converts power generated through solar power panels or power being outputted from a battery that stores power being generated by solar power panels into power suitable for the grid. The power conversion device 300 may be a two-way inverter that receives power from the grid to charge the battery or provides power to the grid when solar power generation is difficult, or when external power is cheap. The power conversion device 300 may include a control unit that controls the power conversion device 300 by sensing the voltage or current of the input terminal and the output terminal. Here, the control unit may be an MCU and may perform maximum power point tracking control to increase the efficiency of solar power generation. The efficiency of solar power generation can be increased using maximum power point tracking (MPPT). In solar power generation, depending on the relationship between current and voltage and the characteristics of the relationship between voltage and power, the maximum power may not be the maximum voltage, but the power at about 80% of the maximum voltage. Since this maximum power point continues to change depending on the size of the current generated by the solar power panel, it is necessary to continuously find the point where the maximum power point can be generated. That is, in order to follow the maximum power rather than the maximum voltage, the magnitude of the voltage and current can be varied to achieve the maximum power. In other words, the voltage can be decreased and the current increased in the direction of increasing power, or the voltage can be increased and the current can be decreased.

The auxiliary power generation circuit 100 comprises: a switching unit 110 including at least one upper switch and at least one lower switch being conducted complementarily to each other; a resonant converter 120 that converts power being inputted from the switching unit 110 and outputs it; and a rectifier 130 that rectifies the output of the resonant converter 120 to output an auxiliary power.

The switching unit 110 may be formed as a half-bridge circuit including one upper switch and one lower switch, or may be formed as a full-bridge circuit including a plurality of upper switches and a plurality of lower switches.

The resonant converter 120 may include: a primary circuit configuring a resonant circuit; and a secondary circuit including a first coil and a second coil being connected in parallel, wherein the primary circuit includes: a first capacitor and a second capacitor being connected in series with each other; a first inductor being connected to a node between the first capacitor and the second capacitor; and a third coil being connected in series with the first inductor, wherein the upper switch and the lower switch are connected in series, wherein one end of the third coil is connected to the first inductor, and the other end is connected to a node between the upper switch and the lower switch, wherein the first coil, the second coil, and the third coil may form a transformer, and wherein the primary circuit may comprise an LLC resonant converter, an LCC resonant converter, or a CLC resonant converter.

The rectifier 130 may include a first diode being connected in series with the first coil and a second diode being connected in series with the second coil, and may include an output unit 140 that provides power being outputted from the rectifier as auxiliary power, wherein one end of the output unit 140 may be connected to a node between the first coil and the second coil, and the other end may be connected to a node between the first diode and the second diode.

The resonant converter 120 includes: a plurality of primary circuits being connected in parallel; and a plurality of secondary circuits corresponding to the plurality of primary circuits, wherein the rectifier includes a plurality of rectifiers corresponding to the plurality of secondary circuits, wherein the plurality of primary circuits may output multiple individual auxiliary power through one secondary circuit among the plurality of secondary circuits and one rectifier among the plurality of rectifiers, wherein the auxiliary power may be a gate driver power of a switching element having a reference potential different from the ground, and wherein the resonant converter can operate at a resonant frequency according to the control of the control unit. Here, the control unit may be a control unit of the power conversion device 300.

Those skilled in the art related to the present embodiment will be able to understand that it may be implemented in a modified form within a range that does not deviate from the essential characteristics of the above description. Therefore, the disclosed methods are to be considered in an illustrative rather than a limiting sense. The scope of the present invention is shown in the claims rather than the foregoing description, and all differences within the equivalent scope shall be construed as being included in the present invention.

The invention claimed is:

1. A circuit for generating auxiliary power comprising:
   a switching unit comprising at least one upper switch and at least one lower switch which are conducting complementarily to each other;
   a resonant converter configured to convert power inputted from the switching unit and output the converted power; and
   a rectifier configured to rectify the output of the resonant converter to output an auxiliary power,
   wherein the resonant converter comprises a plurality of primary circuits connected in parallel and a plurality of secondary circuits corresponding to the plurality of primary circuits,
   wherein the rectifier comprises a plurality of rectifiers corresponding to the plurality of secondary circuits,
   wherein the plurality of primary circuits outputs a plurality of individual auxiliary powers through one secondary circuit among the plurality of secondary circuits and one rectifier among the plurality of rectifiers, and
   wherein the auxiliary power is a power of gate driver of a switching element having a reference potential different from ground.

2. The circuit for generating auxiliary power according to claim 1,
   wherein the switching unit is formed as a half-bridge circuit comprising the one upper switch and the one lower switch or formed as a full-bridge circuit comprising a plurality of upper switches and a plurality of lower switches.

3. The circuit for generating auxiliary power according to claim 1,
   wherein the resonant converter comprises:
   a primary circuit constituting a resonant circuit; and
   a secondary circuit comprising a first coil and a second coil connected in parallel.

4. The circuit for generating auxiliary power according to claim 3,
   wherein the primary circuit comprises:
   a first capacitor and a second capacitor connected in series with each other;

a first inductor connected to a node between the first capacitor and the second capacitor; and a third coil connected in series with the first inductor, wherein the upper switch and the lower switch are connected in series, wherein one end of the third coil is connected to the first inductor and the other end is connected to a node between the upper switch and the lower switch, and wherein the first coil, the second coil, and the third coil form a transformer.

5. The circuit for generating auxiliary power according to claim 3, wherein the primary circuit constitutes an LLC resonant converter, an LCC resonant converter, or a CLC resonant converter.

6. The circuit for generating auxiliary power according to claim 3, wherein the rectifier comprises:

a first diode connected in series with the first coil; and a second diode connected in series with the second coil.

7. The circuit for generating auxiliary power according to claim 6, comprising:

an output unit configured to provide power outputted from the rectifier as an auxiliary power, wherein one end of the output unit is connected to a node between the first diode and the second diode, and the other end is connected to a node between the first coil and the second coil.

8. The circuit for generating auxiliary power according to claim 1, wherein the resonant converter operates at a resonant frequency.

9. An auxiliary power generation device comprising:

a switching unit comprising at least one upper switch and at least one lower switch which are conducting complementarily to each other;

a resonant converter configured to convert the voltage inputted from the switching unit and outputs it;

a rectifier configured to rectify the output of the resonant converter and outputs an auxiliary power; and a control unit configured to control a switching frequency of the switching unit so that the resonant converter operates at a resonant frequency, wherein the resonant converter comprises a plurality of primary circuits connected in parallel and a plurality of secondary circuits corresponding to the plurality of primary circuits, wherein the rectifier comprises a plurality of rectifiers corresponding to the plurality of secondary circuits, wherein the plurality of primary circuits outputs a plurality of individual auxiliary powers through one secondary circuit among the plurality of secondary circuits and one rectifier among the plurality of rectifiers, and wherein the auxiliary power is a power of gate driver of a switching element having a reference potential different from ground.

10. The auxiliary power generation device according to claim 9, wherein the switching unit is formed as a half-bridge circuit comprising the one upper switch and the one lower switch or formed as a full-bridge circuit comprising a plurality of upper switches and a plurality of lower switches.

11. The auxiliary power generation device according to claim 9, wherein the resonant converter comprises:

a primary circuit constituting a resonant circuit; and a secondary circuit comprising a first coil and a second coil connected in parallel.

12. The auxiliary power generation device according to claim 11, wherein the primary circuit comprises:

a first capacitor and a second capacitor connected in series with each other;

a first inductor connected to a node between the first capacitor and the second capacitor; and a third coil connected in series with the first inductor, wherein the upper switch and the lower switch are connected in series, wherein one end of the third coil is connected to the first inductor and the other end is connected to a node between the upper switch and the lower switch, and wherein the first coil, the second coil, and the third coil form a transformer.

13. The auxiliary power generation device according to claim 11, wherein the primary circuit constitutes an LLC resonant converter, an LCC resonant converter, or a CLC resonant converter.

14. The auxiliary power generation device according to claim 11, wherein the rectifier comprises:

a first diode connected in series with the first coil; and a second diode connected in series with the second coil.

15. The auxiliary power generation device according to claim 14, comprising:

an output unit configured to provide power outputted from the rectifier as an auxiliary power, wherein one end of the output unit is connected to a node between the first diode and the second diode, and the other end is connected to a node between the first coil and the second coil.

16. The auxiliary power generation device according to claim 9, wherein the resonant converter operates at a resonant frequency.

* * * * *